Aug. 12, 1969     H. DE BOER     3,460,877
ASHTRAY WITH SPRING MOUNTED ROLLERS
Filed July 19, 1967     3 Sheets-Sheet 1
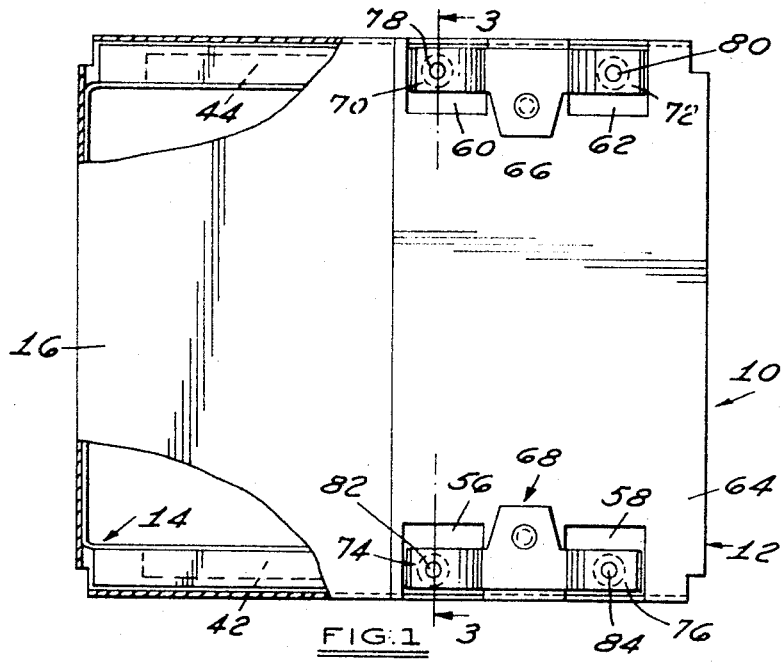
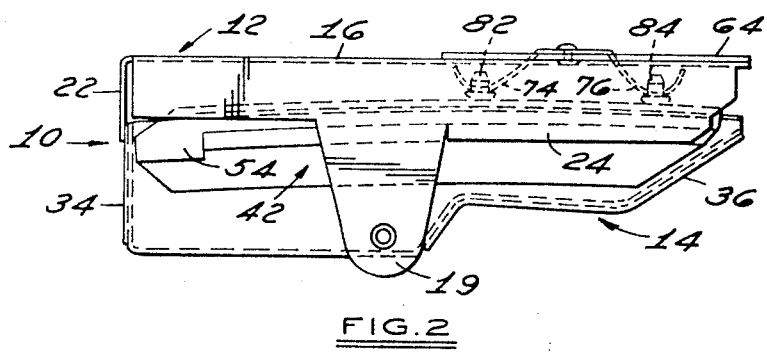
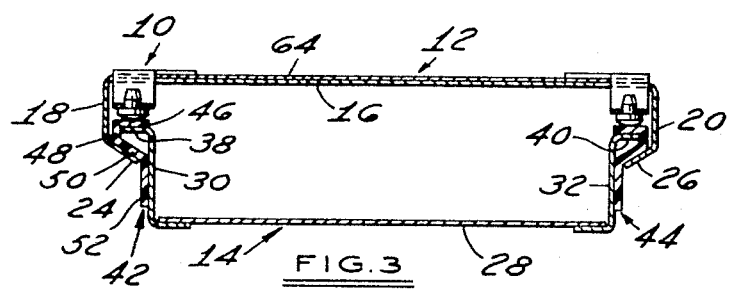
INVENTOR
HENRY DE BOER
BY
Whittemore, Hulbert
& Belknap
ATTORNEYS

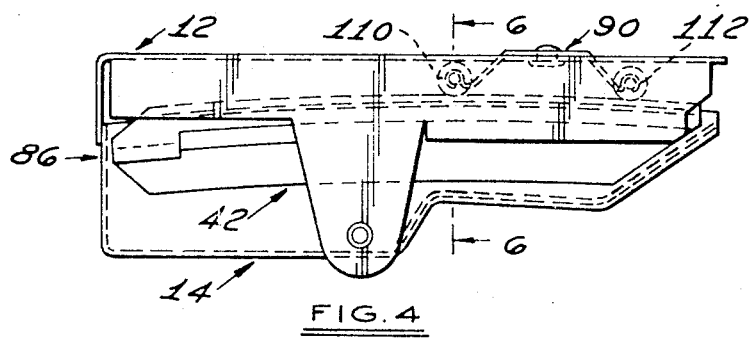
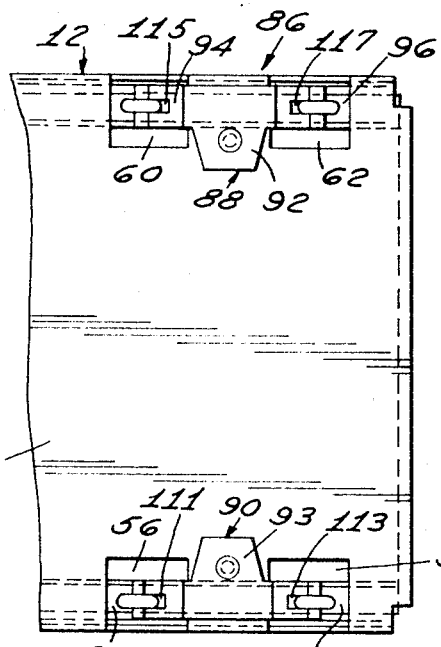
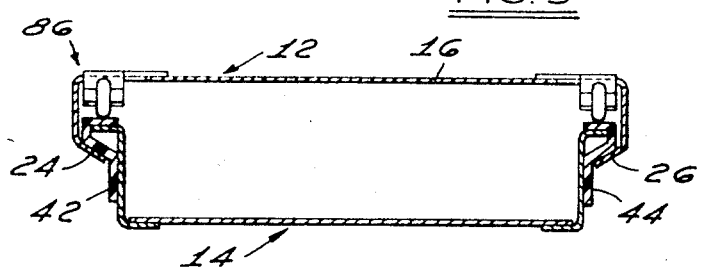

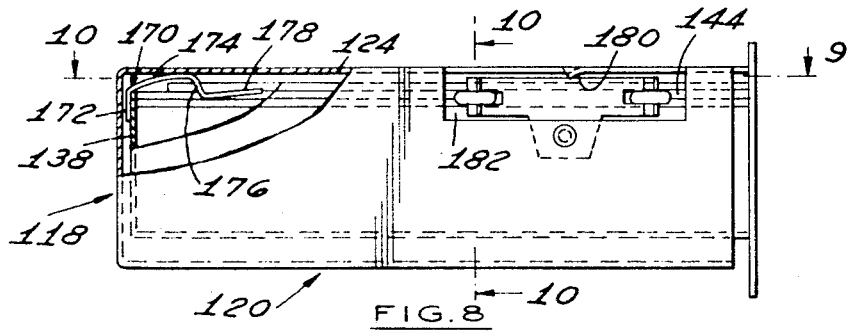
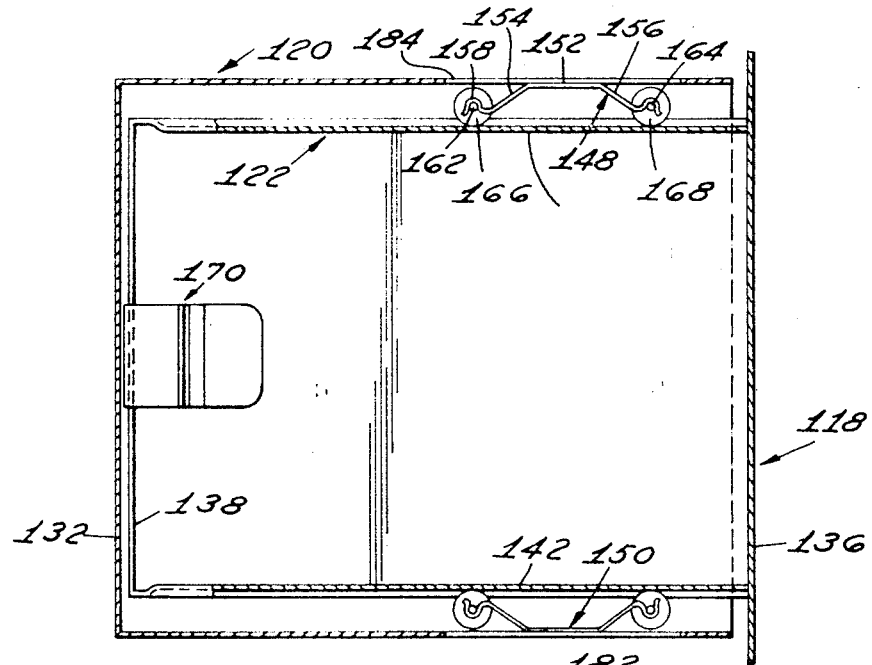
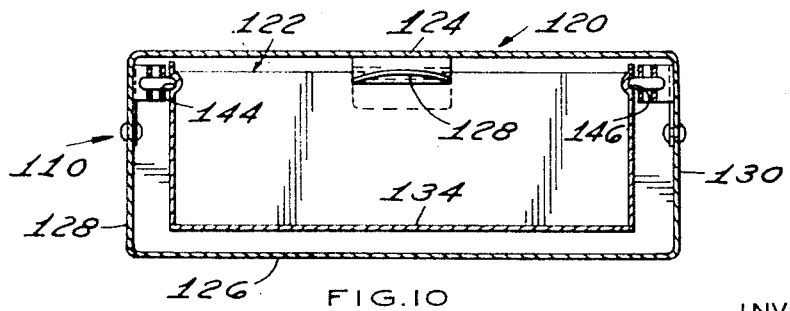
INVENTOR
HENRY DE BOER cd# United States Patent Office 3,460,877
Patented Aug. 12, 1969

3,460,877
ASHTRAY WITH SPRING MOUNTED ROLLERS
Henry De Boer, Grand Rapids, Mich., assignor to F. L. Jacobs Co., Detroit, Mich., a corporation of Michigan
Filed July 19, 1967, Ser. No. 654,645
Int. Cl. B60n 3/08, 3/10, 3/12
U.S. Cl. 312—246    9 Claims

ABSTRACT OF THE DISCLOSURE

The vehicle ashtray is of the drawer type. A housing is provided for attachment to the dashboard or other suitable support structure within a vehicle as is conventional. The drawer, which is for the reception of ashes, is slidably received within the housing for withdrawal as the need arises. The drawer has an elongated guide on each side. The housing has an anti-friction structure in engagement with the guides. The anti-friction structure may be, for example, rollers or button-like projections. Preferably, the anti-friction means are fabricated of one of the slippery plastics such as nylon.

A pair of spaced apart openings are provided in the housing in alignment with the guides on the drawer. A pair of elongated springs are secured to the housing. Each free end of each spring is in alignment with one of the openings and a portion of each free end extends into the housing toward the adjacent guide. Anti-friction means are carried on each free end of each spring in resilient engagement with a guide. The anti-friction members are located substantially within the housing but are movable through the openings and out of the housing as a result of pressure applied via the drawer.

Background of the invention

Numerous designs for vehicle ashtrays have been made in the past. An acceptable ashtray design must meet a number of requirements. One requirement is that the ashtray construction must be susceptible to low cost manufacture. Another is that the design should be compact so as to use a minimum amount of space in the vehicle. The ashtray design must be rugged to withstand the stress of years of use in a vehicle.

Further, in drawer-type ashtrays, the drawer element must be easily slidable inwardly and outwardly and it must be sufficiently restrained so that it will not move without the application of an external force thereto. The construction must be such that the drawer will not bind or jam. Finally, the drawer must be easily removable to permit emptying thereof.

The present invention combines all of these qualities to an optimum degree.

Summary of the invention

The vehicle ashtray comprises a housing for fastening to a vehicle. A drawer for ashes is removably received in the housing. The drawer has an elongated guide on each side portion thereof. The housing has aperture means in registry with each of the guides. Resilient means are provided on the housing adjacent each guide. The resilient means have a portion extending towards the adjacent guide. The extending portion is in alignment with the adjacent aperture means. An anti-friction structure is carried by each resilient means. The anti-friction structure is in resilient engagement with a guide. The anti-friction structure is also in alignment with an adjacent aperture means and is movable therethrough as a result of pressure applied via the drawer.

In the drawings:

FIGURE 1 is a top plan view with portions broken away of one embodiment of a vehicle ashtray in accordance with the present invention;

FIGURE 2 is a side elevational view of the ashtray of FIGURE 1;

FIGURE 3 is a sectional view taken substantially along the line 3—3 of FIGURE 1 looking in the direction of the arrows;

FIGURE 4 is a side elevational view of another embodiment of the present invention;

FIGURE 5 is a top plan view of the forward portion of the ashtray illustrated in FIGURE 4;

FIGURE 6 is a sectional view taken substantially along the line 6—6 of FIGURE 4 looking in the direction of the arrows;

FIGURE 7 is a view of the spring and roller construction utilized in the FIGURE 4 embodiment;

FIGURE 8 is a side elevational view with portions broken away of another embodiment of the present invention;

FIGURE 9 is a sectional view taken substantially along the line 9—9 of FIGURE 8 looking in the direction of the arrows; and FIGURE 10 is a sectional view taken substantially along the line 10—10 of FIGURE 8 looking in the direction of the arrows.

Referring first to the embodiment illustrated in FIGURES 1–3, it will be noted that the vehicle ashtray 10 comprises a housing 12 which removably receives a drawer for ashes 14. In use, the housing 12 is secured to a suitable panel or support structure in the vehicle, usually the vehicle dash-board.

The housing 12 comprises an upper platelike portion 16 having downwardly directed side walls 18, 20 on each side thereof. The side walls have ears 19 for attachment to the support structure. A downwardly directed wall 22 is also provided at the rear. Inwardly and downwardly directed flanges 24, 26 are provided on the lower edges of the forward portion of the side walls 18, 20. As will be noted, the side flanges 24, 26 are relatively short.

The drawer 14 comprises a bottom wall 28, side walls 30, 32, rear wall 34 and front wall 36. Each of these wall members is provided as a separate unit. The drawer construction is formed by securing the wall members together by welding overlapping flange portions.

Each of the side walls 30, 32 has an outwardly directed flange 38, 40 on the upper edge thereof. The flanges 38, 40 receive guide members 42, 44. The guide members are preferably fabricated from a slippery plastic material.

Each guide comprises an upper wall portion 46 which lies in a substantially horizontal plane. A vertical wall portion 48 extends downwardly therefrom. An angularly inwardly directed wall portion 50 extends from the wall portion 48 towards the side wall of the drawer. A downwardly directed wall portion 52 extends from the portion 50. The portion 52 is secured to the side wall 52 as by cementing or riveting. The wall portions 46, 48, 50 define a recess for reception of the flange 38.

A downwardly directed projection 54 is provided at the rearmost portion of the guide. The projection 54 acts as a stop member for engagement with the flange 24 to limit the extent of withdrawal of the drawer.

A pair of spaced apart openings 56, 58, 60, 62 are provided on each side of the housing top 16 forwardly thereof and adjacent to the side walls 18, 20. A plate 64 is secured on the housing top 16. The plate 64 has openings in registry with the openings in the housing. As will be noted in FIGURE 1, these openings are in alignment with the guide members 42, 44. The plate 64 reinforces the front portion of the housing, this being the portion of the housing which receives most strain in use. An elongated spring 66, 68 fabricated of flat stock is secured to the plate 64 by rivets. Each free end 70, 72, 74, 76 of the springs is formed in a U-shape and extends through the openings in the housing towards the guides 42, 44.

A button-like slide element 78, 80, 82, 84 is mounted on each free end of each spring and is in resilient engagement with the upper surface of the guides 42, 44. These slide elements are fabricated of an anti-friction material, for example, a slippery plastic such as nylon. It will be noted that the portion of each spring which is exterior of the housing 12 is substantially flush with the housing surface. The remaining portions of each spring extend entirely within the housing. This construction is advantageous in that the spring structure present a minimal projecting portion exterior of the housing to thereby make the unit compact.

In operation, the drawer 14 is pulled in or out of the housing 12 as need requires. The flanges 24, 26 on the housing 12 provide sliding engagement with the underside of the guides 42, 44. The button-like elements 78, 80, 82, 84 provide resilient sliding contact with the upper surface of each guide. This arrangement prevents the drawer 14 from binding while at the same time providing sufficient resistance to drawer movement to prevent the drawer from sliding in and out as a result of vehicle motion.

It will be noted that there is a relatively large clearance space between the upper surface of each guide and the housing plate 16. This arrangement, in combination with the location of the free ends of the spring members 66, 68 within the housing, result in a relatively large permissible tolerance range in the physical dimensions of the various parts. This is of importance when manufacturing a high volume, low cost item such as a vehicle ashtray.

Additionally, this clearance permits complete withdrawal of the drawer 14 from the housing when it is necessary to empty the drawer. When it is desired to remove the drawer, it is withdrawn until the stop members 54 on the guides engage the housing flanges 24, 26. The forward portion of the drawer is then tilted downwardly to position the stops above the flanges 24, 26. The drawer may then be completely removed. In the tilting operation, the springs 66, 68 are biased upwardly. The openings 56, 58, 60, 62 are sufficiently large to permit the spring structure to move outside of the housing thereby providing the necessary clearance for removal of the drawer.

The embodiment illustrated in FIGURES 4–7 is in most respects similar to that of FIGURES 1–3. The principal difference is that a roller structure is provided in place of the slide elements for engagement with the drawer guides.

The ashtray 86 comprises the housing 12 and drawer 14 as previously described. Spring members 88, 90 are mounted directly on the housing plate 16 by means of rivets. These springs, which are fabricated of flat spring stock, each comprise a central straight portion 92, 93 which is located exteriorly of the housing and is flush with the exterior surface thereof. The free ends 94, 96, 98, 100 of each spring is angled downwardly and projects through the openings 56, 58, 60, 62 into the housing interior. As will be noted in FIGURE 7, the ends 102, 104 of each spring are turned to form a circular bushing structure for reception of the axles 106, 108 of rollers 110, 112. The thus defined bushing structure is not completely closed. The spaces 114, 116 permit insertion of the roller axles into the bushing structure. Openings 111, 113, 115, 117 are provided in the springs to accommodate the rollers.

As will be appreciated, the rollers are biased into resilient engagement with the upper surface of the guides 42, 44. The rollers permit freer sliding of the drawer 14 than is the case with the slide-button arrangement illustrated in FIGURES 1–3. However, there is sufficient restraining force exerted by the rollers to prevent the drawer from sliding in and out as a result of vehicle motion.

As in the FIGURES 1–3 embodiment, the drawer may be completely removed from the housing by tilting the forward portion thereof downwardly to bias the spring rollers upwardly and permit movement of the guide stops past the flanges 24, 26 of the housing 12.

The embodiment illustrated in FIGURES 8–10 differs considerably from the two embodiments which have been described. However, the basic concept of the first two embodiments is incorporated in this third embodiment.

The ashtray 118 comprises a housing 120 and a drawer 122 which is removably received therein. The housing 120 comprises a box-like structure having an open front for reception of the drawer. The housing has a top wall 124, bottom wall 126, side walls 128, 130, and the rear wall 132.

The drawer 122 comprises a bottom wall 134, front wall 136, rear wall 138, and side walls 140, 142.

Each of the drawer side walls has a longitudinally extending groove 144, 146 adjacent to the upper edge thereof. The grooves 144, 146 serve as guides for rollers provided on the housing.

A spring structure similar to that disclosed in FIGURES 4–7 is provided on the interior of each side wall of the housing. As will be noted, the springs 148, 150 are secured within the housing in alignment with the grooves 144, 146. Each spring comprises a flat straight portion 152 which is secured to the housing side wall. The free ends 154, 156 extend angularly inwardly towards the drawer 122. A bushing 158, 160 is formed on the tip of each free end to receive the axles 162, 164 of the rollers 166, 168. The rollers are received in the grooves 144, 146.

It will be noted that the drawer 122 is completely free from contact with the interior of the housing 120. The springs 148, 150 bias the rollers in opposing directions to permit complete support of the drawer 122 by the rollers. Completely free movement of the drawer is inhibited by means of a spring 170 provided on the rear wall 138 of the drawer. The spring 170 has a downwardly extending lip 172 which is secured to the wall 138. An upwardly curved portion 174 extends from the lip 172 into sliding contact with the undersurface of the top wall 124 of the housing. The frictional drag provided by this sliding contact prevents movement of the drawer as a result of vehicle motion.

A downwardly angled portion 176 extends from curved portion 174. A tab extends forwardly from portion 176. The portion 176 serves as a stop member to normally prevent complete withdrawal of the drawer from the housing. A downwardly extending projection 180 is struck out of the housing top wall. When the stop 176 engages the projection 180, further withdrawal of the drawer is prevented. However, the drawer may be completely removed by depressing the tab 178 whereby the stop 176 will clear the projection 180.

Referring to FIGURES 8 and 9, it will be noted that an elongated aperture 182, 184 is provided in each side wall of the housing in registry with the rollers. The apertures are of sufficient size to permit passage of the free ends of the springs 148, 150. The drawer 122 can thus be cocked a considerable distance from side to side without jamming or binding the roller structure. As previously mentioned, this arrangement also permits relatively large tolerances in the physical dimensions of the components.

What I claim as my invention is:

1. A vehicle ashtray comprising a housing for fastening to a vehicle, a drawer for ashes removably received in said housing, said drawer having an elongated guide adjacent each side thereof, said housing having aperture means in registry with each of the guides, resilient means on said housing adjacent each guide, each resilient means having a portion extending toward its respective guide and in alignment with the adjacent aperture means, and an anti-friction structure carried by each resilient means in resilient engagement with one of the guides, said anti-friction structure being in alignment with its respective aperture means and being movable therethrough as a result of pressure applied via the drawer.

2. A vehicle ashtray as in claim 1 and further characterized in that each aperture means comprises a pair of spaced apart openings, said resilient means each comprising an elongated spring secured intermediate the ends thereof to the housing between the openings, each free end of each spring being in alignment with one of the openings, a portion of each free end extending towards the adjacent guide, and an anti-friction member carried by each extending portion of each spring in resilient engagement with the respective guide.

3. A vehicle ashtray as in claim 2 and further characterized in that the anti-friction members are rollers, each roller having an axle, the free end of each spring being turned to form a bushing for reception of an axle, the bushing having a gap smaller than the diameter of the axle to permit insertion of the axle, and an axle received in each bushing.

4. A vehicle ashtray as in claim 2 and further characterized in that each of said springs is secured to the housing exterior, each extending portion extending substantially within the housing, each portion of each spring exterior of the housing being substantially flush with the housing surface whereby the springs present a minimal projecting structure exterior of the housing.

5. A vehicle ashtray as in claim 2 and further characterized in that each of said springs is located in the housing interior whereby the springs do not present a projecting structure exterior of the housing.

6. A vehicle ashtray as in claim 2 and further characterized in that a plate member is secured to the housing and extends the width thereof, said plate member having openings in registry with the openings in the housing, each of said springs being secured to the plate.

7. A vehicle ashtray as in claim 1 and further characterized in that each of said guides is fabricated of an anti-friction material.

8. A vehicle ashtray as in claim 1 and further characterized in that each of said guides comprises an elongated projection extending sidewardly from the drawer, each of said projections having an upper surface and a lower surface, a pair of flanges on the housing each in sliding engagement with one of said surfaces, said anti-friction structure being in engagement with the other of said surfaces.

9. A vehicle ashtray as in claim 8 and further characterized in that the anti-friction structure engages the upper of said surfaces and the flanges engage the lower of said surfaces, said flanges being relatively short and located forwardly of the housing, a stop member on at least one of the guides adjacent the rearmost portion thereof, the upper surface of each guide being spaced a distance from the housing sufficient to permit tilting of the drawer against the action of the resilient means to permit passage of the stop member past the flange for complete removal of the drawer from the housing.

References Cited

UNITED STATES PATENTS

| | | | |
|---|---|---|---|
| 2,809,877 | 10/1957 | Hammesfahr | 312—246 |
| 3,109,688 | 11/1963 | Middleton | 312—246 |
| 3,285,683 | 11/1966 | Middleton et al. | 312—246 |

CASMIR A. NUNBERG, Primary Examiner

U.S. Cl. X.R.

206—19; 312—242